United States Patent
Duppong et al.

(10) Patent No.: US 9,551,418 B1
(45) Date of Patent: Jan. 24, 2017

(54) SYSTEM AND METHOD FOR REDUCING ENGINE FLYWHEEL POWER REDUCTION WHILE PROTECTING DRIVETRAIN COMPONENTS

(71) Applicant: DEERE & COMPANY, Moline, IL (US)

(72) Inventors: Steven A. Duppong, Cedar Falls, IA (US); Adam Faucher, Cedar Falls, IA (US); Steven C. Young, Ankeny, IA (US); Andrew K. Rekow, Cedar Falls, IA (US); Colin A. MacDonald, Cedar Falls, IA (US); Udo Scheff, Worms (DE); Steve P. Robisky, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/795,980

(22) Filed: Jul. 10, 2015

(51) Int. Cl.
*B60W 10/06* (2006.01)
*B60W 10/10* (2012.01)
*F16H 63/50* (2006.01)

(52) U.S. Cl.
CPC ......... *F16H 63/50* (2013.01); *F16H 2063/508* (2013.01)

(58) Field of Classification Search
None
See application file for complete search history.

(56) References Cited

U.S. PATENT DOCUMENTS

| 8,337,359 | B2 | 12/2012 | Hofbauer |
| 2005/0182544 | A1* | 8/2005 | Preisner ............ F16H 61/0437 701/51 |
| 2006/0116238 | A1* | 6/2006 | Karlsson ............... B60K 17/28 477/109 |
| 2010/0276221 | A1* | 11/2010 | Rose ..................... B60K 6/12 180/165 |
| 2012/0285291 | A1* | 11/2012 | Shi ....................... B60K 6/105 74/665 A |

FOREIGN PATENT DOCUMENTS

CN 203305830 U 11/2013

* cited by examiner

*Primary Examiner* — Edwin A Young

(57) ABSTRACT

Methods and systems are disclosed for reducing engine flywheel power reduction of an engine while protecting a drivetrain. The method includes monitoring transmission gear selection; determining reduction in flywheel power to protect the drivetrain; and monitoring engine power consumption by other engine power loads. When other engine power loads consume less power than the reduction in flywheel power to protect the drivetrain, the method includes reducing flywheel power by the power difference. When other engine power loads consume the same or more power than the reduction in flywheel power to protect the drivetrain, the method includes not reducing the flywheel power. Engine power can be consumed by both on-vehicle and off-vehicle power loads. Engine power can be consumed by an electric generator and/or a plurality of inverters, and their power consumption can be monitored. Information and commands can be communicated over a controller area network (CAN) bus.

20 Claims, 3 Drawing Sheets

SYSTEM AND METHOD FOR REDUCING ENGINE FLYWHEEL POWER REDUCTION WHILE PROTECTING DRIVETRAIN COMPONENTS

FIELD OF THE DISCLOSURE

The present disclosure relates to engine control systems and methods and more particularly to a system for control of engine flywheel power to protect drivetrain components that accounts for other vehicle power loads.

BACKGROUND

A tractor with a diesel engine typically has a control strategy where the engine flywheel power is reduced in lower vehicle gears to control torque through the driveline to manage drivetrain life. If an operator is pulling with a large tractor at maximum engine flywheel power and needs to downshift to continue to pull the load, the engine flywheel power will get reduced by the vehicle controller to protect the drivetrain from high torque. This prevents the operator and other vehicle systems from accessing the full power capacity of the engine during slower field operations.

It would be desirable to have more of the flywheel power accessible to the operator while protecting the drivetrain by accounting for flywheel power being consumed or offloaded to other systems.

SUMMARY

A method is disclosed for reducing engine flywheel power reduction of an engine on a vehicle while protecting a drivetrain of the vehicle. The method includes monitoring gear selection of a transmission of the vehicle; determining a reduction in engine flywheel power needed to protect the drivetrain as a result of the gear selection of the transmission; and monitoring engine power consumption by power loads other than the drivetrain consuming power produced by the engine. When the engine power consumption by the power loads other than the drivetrain is less than the reduction in engine flywheel power needed to protect the drivetrain, the method also includes reducing engine flywheel power by the difference between the reduction in engine flywheel power needed to protect the drivetrain and the engine power consumption by the power loads other than the drivetrain. When the engine power consumption by the power loads other than the drivetrain is greater than or equal to the reduction in engine flywheel power needed to protect the drivetrain, the method includes not reducing the engine flywheel power.

Monitoring engine power consumption by power loads other than the drivetrain can include monitoring power consumption by both on-vehicle and off-vehicle power loads that consume power generated by the engine. Monitoring engine power consumption by power loads other than the drivetrain can include monitoring power consumption by an electric generator, where the electric generator consumes power produced by the engine. Monitoring power consumption by the electric generator can include monitoring a speed and a torque of the electric generator; and computing power consumption of the electric generator as a function of the speed and the torque of the electric generator. Monitoring engine power consumption by power loads other than the drivetrain can include monitoring power consumption by a plurality of power inverters, where each of the plurality of power inverters receives power generated by the engine. The plurality of power inverters can provide power to both on-vehicle and off-vehicle power loads.

The method can also include using a vehicle interface controller of the vehicle for monitoring the gear selection of the transmission; using an engine interface controller of the vehicle for determining the reduction in engine flywheel power needed to protect the drivetrain; using a power management unit of the vehicle for monitoring the engine power consumption by the power loads other than the drivetrain; communicating the gear selection of the transmission from the vehicle interface controller to the engine interface controller over a controller area network (CAN) bus of the vehicle; communicating the engine power consumption by the power loads other than the drivetrain from the power management unit to the engine interface controller over the CAN bus; and sending an engine power reduction command from the engine interface controller when the engine power consumption by the power loads other than the drivetrain is less than the reduction in engine flywheel power needed to protect the drivetrain. The power management unit can monitor power consumption by both on-vehicle and off-vehicle power loads that consume power generated by the engine. The power management unit can monitor power consumption by an electric generator, where the electric generator consumes power produced by the engine. The power management unit can monitor power consumption by a plurality of power inverters, where each of the plurality of power inverters receives power generated by the engine.

A system is disclosed for reducing engine flywheel power reduction of an engine on a vehicle while protecting a drivetrain of the vehicle. The system includes a vehicle interface controller, a power management unit and an engine interface controller. The vehicle interface controller monitors a transmission gear selection of the vehicle. The power management unit monitors engine power consumption by power loads other than the drivetrain that consume power produced by the engine. The engine interface controller determines a reduction in engine flywheel power needed to protect the drivetrain based on the transmission gear selection, and compares the reduction in engine flywheel power needed to protect the drivetrain with the engine power consumption by the power loads other than the drivetrain. When the engine power consumption by the power loads other than the drivetrain is less than the reduction in engine flywheel power needed to protect the drivetrain, the engine interface controller generates a command to reduce engine flywheel power by the difference between the reduction in engine flywheel power needed to protect the drivetrain and the engine power consumption by the power loads other than the drivetrain. When the engine power consumption by the power loads other than the drivetrain is greater than or equal to the reduction in engine flywheel power needed to protect the drivetrain, the engine interface controller does not generate a command to reduce the engine flywheel power.

The power management unit can monitor power consumption by both on-vehicle and off-vehicle power loads that consume power generated by the engine. The system can also include an electric generator that consumes power produced by the engine, and the power management unit can monitor power consumption by the electric generator. The power management unit can monitor a speed and a torque of the electric generator, and computes the power consumption of the electric generator as a function of the speed and the torque of the electric generator. The system can also include a plurality of power inverters that receive power generated by the engine, and the power management unit can monitor power consumption by the plurality of power inverters. The plurality of power inverters can provide power to both on-vehicle and off-vehicle power loads.

The system can also include a controller area network (CAN) bus, where the vehicle interface controller, the power management unit and the engine interface controller communicate over the CAN bus.

The system can also include an engine control unit that sends control commands to the engine; and when the engine power consumption by the power loads other than the drivetrain is less than the reduction in engine flywheel power needed to protect the drivetrain, the engine interface controller can send the command to reduce engine flywheel power to the engine control unit.

The system can also include an operator input that a vehicle operator uses to select a transmission gear, and the vehicle interface controller can monitor the operator input to determine the transmission gear selection.

The above and other features will become apparent from the following description and the attached drawings.

BRIEF DESCRIPTION OF THE DRAWINGS

The detailed description of the drawing refers to the accompanying figures in which.

DETAILED DESCRIPTION

Today a vehicle has a control strategy where the engine flywheel power is reduced in lower vehicle gears to reduce peak torque through the driveline and extend the drivetrain life. An alternative is to account for engine flywheel power being redirected to and consumed by an electrical generator and/or other vehicle power loads (for example, transmission pump, selective control valves (SCVs), etc.). By accounting for the flywheel power being consumed by this electrical generator and/or other vehicle power loads, the flywheel power can be kept at or closer to full capacity while still protecting the drivetrain.

Figure 1:
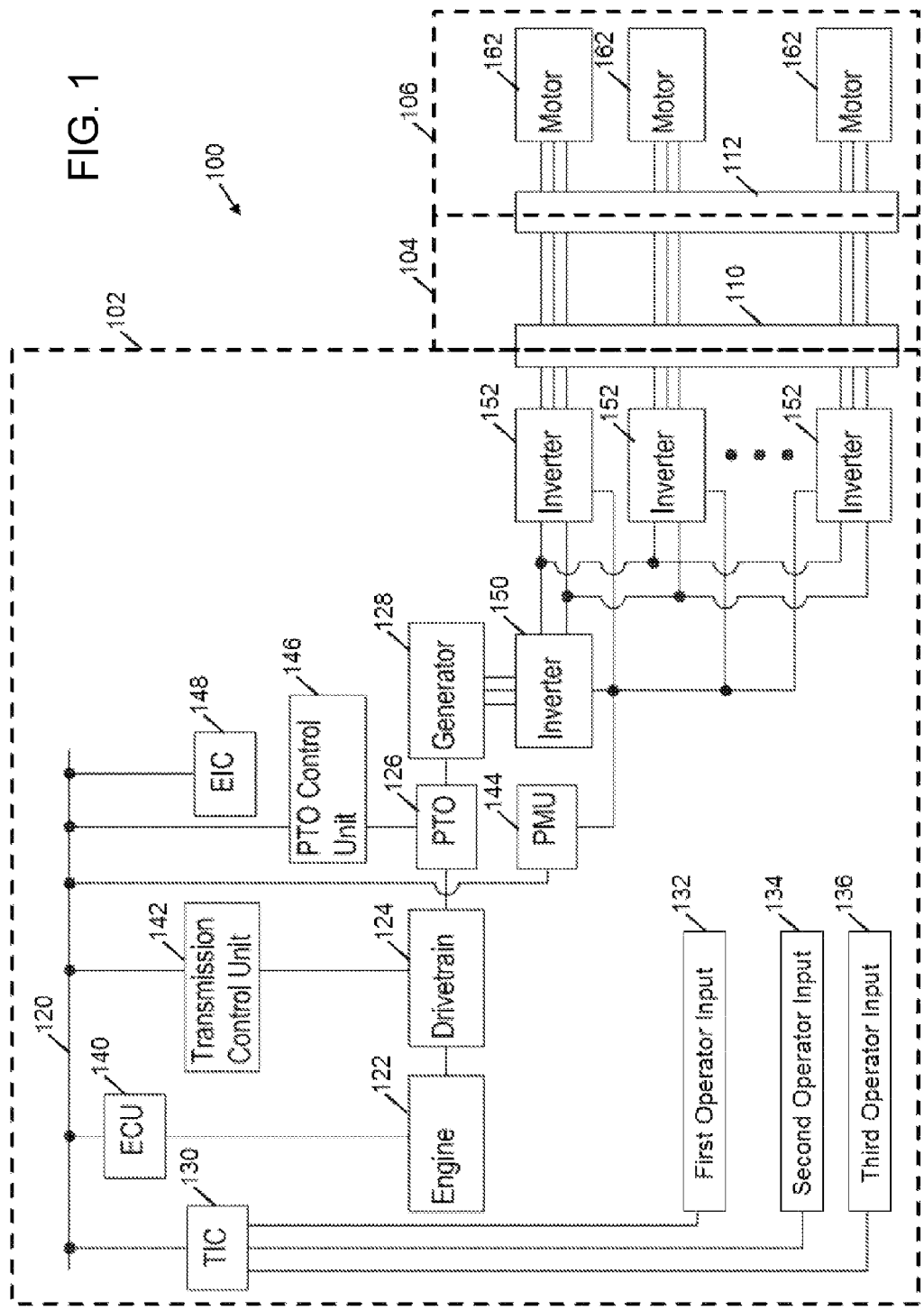
FIG. 1 illustrates a schematic of an exemplary system with the ability to redirect engine flywheel power to vehicle power loads.

FIG. 1 illustrates a schematic of an exemplary system 100 with the ability to redirect engine flywheel power to vehicle power loads. The system 100 includes a vehicle or tractor 102 coupled to an agricultural tool or implement 104 (for example, an air drill seeder) that is coupled to a cart 106 (for example, an agricultural commodity cart). The tractor 102 and the tool 104 can be coupled with a first three phase connector 110. The tool 104 and the cart 106 can be connected with a second three phase connector 112.

The tractor 102 includes a controller area network (CAN) bus 120, an engine 122, a drivetrain 124 and an electric generator 128. The engine 122 is coupled to the drivetrain 124, the drivetrain 124 is coupled to a power take off (PTO) 126, and the PTO 126 is coupled to the electric generator 128. The CAN bus 120 connects a vehicle or tractor interface controller (TIC) 130, an engine control unit (ECU) 140, an transmission control unit 142, a power management unit (PMU) 144, a PTO control unit 146 and an engine interface controller (EIC) 148.

The TIC 130 couples operator control inputs 132, 134, 136 to the CAN bus 120. The first operator control input 132 can be an operator reverser lever/gear selector used to select a desired gear and a desired direction for the tractor. The second operator control input 134 can be an operator foot clutch pedal. The third operator control input 136 can be an operator steering wheel for the tractor. The ECU 140 is connected to and used to control the engine 122. The transmission control unit 142 is connected to and used to control a transmission in the drivetrain 124. The PTO control unit 146 is connected to and used to control the PTO 126 which can supply mechanical power off the vehicle, for example, to implements that include mowers, bailers, tub grinders, etc. The electric generator 128 is connected to a tractor inverter 150 that is connected to one or more interface inverters 152. The interface inverter(s) 152 can be connected to electrical loads on the tractor 102 and/or to loads coupled to the tractor 102 through the three phase connectors 110, 112. The second three phase connector 112 is coupled to the first three phase connector 110. One or more electrical loads (for example, motors 162 on the cart 106) can be coupled to the interface inverter(s) 152 of the tractor 102. The electric generator 128 is mechanically coupled to the engine 122 through the PTO 126 and can take power from the engine 122 and send it to other systems, for example the motors 162 driving traction axles on the air cart 106.

As the tractor 102 comes under load, the engine 122 will increase power to full capacity, 100% output. As the load increases the operator of the tractor 102 will downshift the transmission to increase torque. The operator may continue to downshift the transmission into a gear where the torque can go high enough to decrease the reliability life of the transmission components 124. To protect against damage to the drivetrain 124, the EIC 148 can monitor the transmission gear and can send a message to the ECU 140 to command the engine 122 to reduce fuel intake, and thereby reduce the total flywheel power output of the engine 122. As the operator shifts into lower gears the EIC 148 can continue to message the ECU 140 to command the engine 122 to reduce flywheel power output.

Using the electric generator 128, some or all of the flywheel power of the engine 122 can be redirected from the drivetrain 124 to other power loads. The PMU 144 can notify the EIC 148 of how much power is being consumed by the other power loads through the electric generator 128. When the EIC 148 would message the ECU 140 to command the engine 122 to reduce flywheel power output, instead the EIC 148 can reduce or eliminate the need to reduce flywheel power output by accounting for power being directed from the engine 122 to other power loads, for example to the motors 162 of the accessory 106. This reduces the total power seen by the drivetrain 124 by the amount of power being consumed by the other power loads. The PTO 126 and electric generator 128 can allow the engine 122 to be run at 100% flywheel command through low speed gear range, thereby allowing the operator to use all the available flywheel power output of the engine 122 in all gears.

Figure 2:
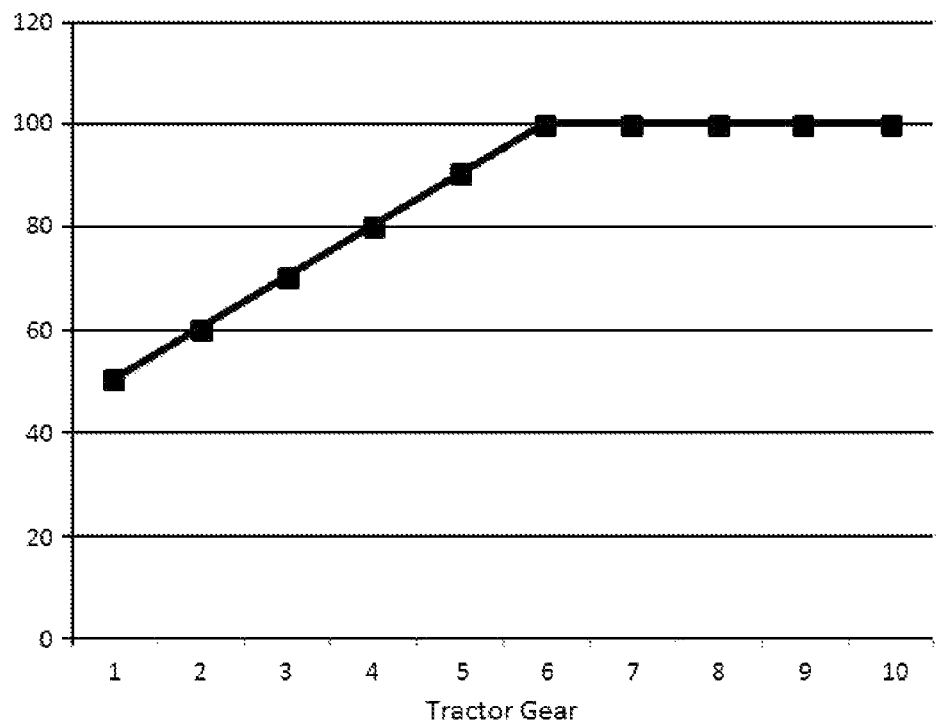
FIG. 2 illustrates a simplified relationship between the percent of engine flywheel power allowed and tractor gear to protect the drivetrain without accounting for other vehicle systems absorbing power.

FIG. 2 illustrates a simplified relationship between the percent of engine flywheel power allowed to protect the drivetrain and tractor gear without accounting for other power loads absorbing power. In this scenario, all of the engine flywheel power is directed to the drivetrain. For sixth gear and above, 100% of engine flywheel power is allowed. For first through fifth gear, an engine interface controller (EIC) sends derate messages to the engine controller to reduce the maximum allowed percentage of engine flywheel power to control the torque going through the drivetrain components. In this simplified relationship, the allowed percentage of engine flywheel power for first through fifth gear is 50%, 60%, 70%, 80% and 90%, respectively.

Figure 3:
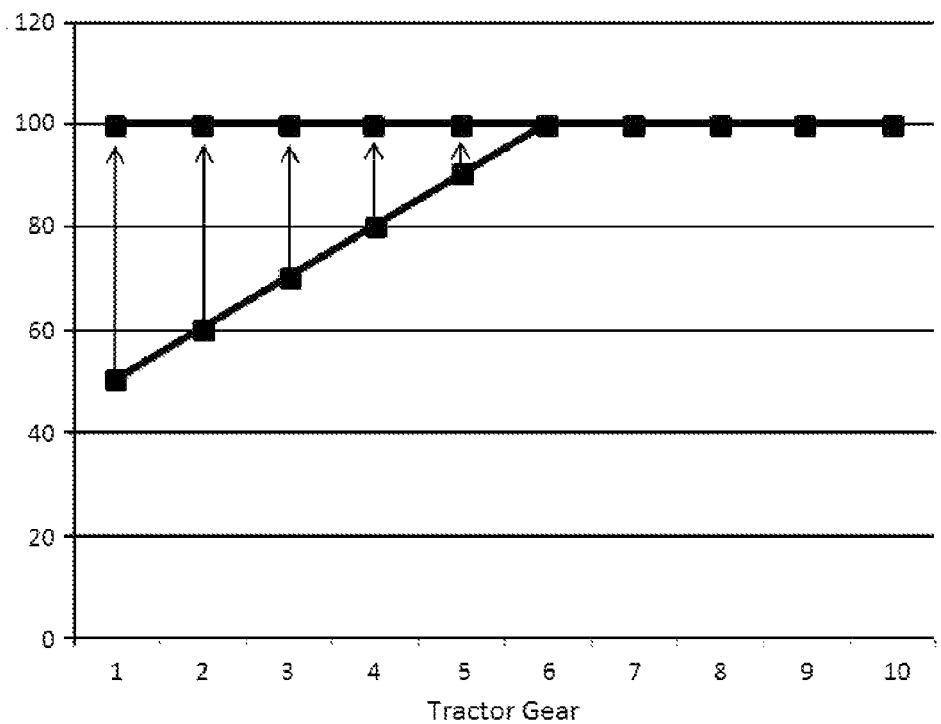
FIG. 3 illustrates an exemplary difference when other vehicle systems absorbing power are taken into account before reducing engine flywheel power to protect the drivetrain.

With this information, and knowledge of how much flywheel power is being consumed by other parasitic power loads, the EIC can reduce the transmission derate while still protecting the drivetrain. FIG. 3 illustrates an exemplary difference when engine flywheel power can be redirected to and consumed by an electric generator or other power loads, and this redirected power is taken into account before reducing engine flywheel power to protect the drivetrain. FIG. 3 shows the change in the relationship between the percent of engine flywheel power allowed and tractor gear with and without accounting for the power redirected to and consumed by the electric generator or other power loads. Accounting for this redirected power and enhanced EIC to take advantage of it, the engine may output 100% of engine flywheel power for all of the tractor gears if a sufficient portion of the engine flywheel power is being absorbed by the electric generator and/or other power loads in first through fifth gears. In this example, the same amount of engine flywheel power is available to the drivetrain but excess power is being redirected and consumed by other power loads.

Using the exemplary embodiment of FIG. 1, the PMU 144 monitors the power inverters 150 and 152, and notifies the EIC 148 of how much power is being consumed through the electric system 128 by both on-vehicle and off-vehicle power loads. The EIC 148 can then adjust the power reduction of the engine 122 required to protect the drivetrain 124 because it now knows that a certain amount of power (x kW) is being offloaded to the electrical system 128 and not going through the drivetrain components 124. Thus, for first through fifth gear, instead of sending derate commands to the ECU 140 for 50%, 40%, 30%, 20% and 10%, respectively, reduction of the engine flywheel power, the EIC 148 can reduce the commanded amount of flywheel power reduction because some or all of the necessary flywheel power reduction to protect the drivetrain 124 is being absorbed by other power loads, for example, the motors 162 of an implement 106 connected to the tractor 102 or some other powered systems receiving power from the engine.

The EIC 148 monitors the amount of derate required to protect the drivetrain 124 and knows the amount of power being consumed by the electrical system 128. The EIC 148 can reduce or eliminate the amount of derate required to protect the drivetrain 124 due to the flywheel power already being consumed by the electrical system 128. The consumption of electrical power can be calculated by monitoring the speed ($\omega_{gen}$) and torque ($\tau_{gen}$) of the generator 128:

$$Power_{elec} = \omega_{gen} * \tau_{gen}$$

The generator inverter 130 can measure the inputs, generator speed and torque, and send that information to the power management unit 144. The power management unit 144 can calculate the electrical power consumption and send the result to the EIC 148. The EIC 148 can check the current transmission gear to determine the derate required to protect the drivetrain 124, and if a derate is required, the EIC 148 can subtract the electrical power usage from the amount of derate. Thus, a smaller derate (or no derate) can be commanded due to the power going through the electrical system 128 instead of the drivetrain 124.

Figure 4:
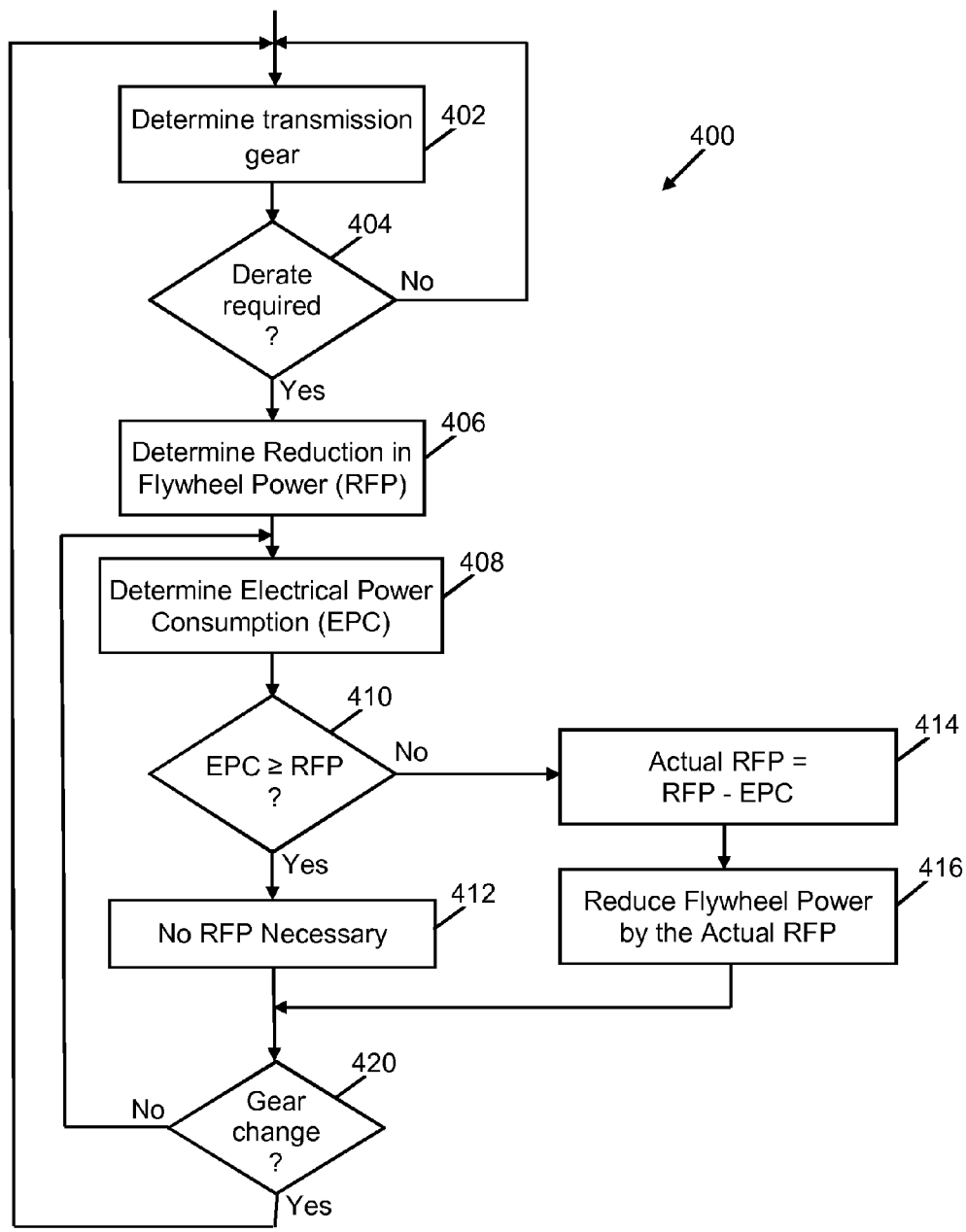
FIG. 4 illustrates an exemplary control diagram for reducing the engine derate required based on the amount of flywheel power being consumed by other systems.

FIG. 4 illustrates an exemplary control flow diagram 400 for a system that decreases the reduction in engine power while maintaining protection of drivetrain components. At block 402, the EIC determines the transmission gear and, at block 404, the EIC determines if a reduction in engine flywheel power (derate) to protect the drivetrain may be needed for this gear. If no reduction in flywheel power to the drivetrain is needed for this gear, control loops back to block 402 until a lower gear is selected where a reduction in flywheel power is needed to protect drivetrain components. If a reduction in flywheel power to the drivetrain may be needed for this gear, control passes to block 406.

At block 406, the EIC determines the reduction in engine flywheel power (RFP) that may be needed to protect the drivetrain. At block 408, the EIC receives the amount of electrical power consumption (EPC) by power loads receiving power from the engine. This EPC value can be provided by the PMU. At block 410, the EIC determines if the electrical power consumption is greater than or equal to the reduction in flywheel power to protect the drivetrain. If the electrical power consumption is greater than or equal to the reduction in flywheel power, control passes to block 412, otherwise control passes to block 414.

At block 412, since the electrical power consumption is greater than or equal to the reduction in engine flywheel power needed to protect the drivetrain, no actual reduction in flywheel power is necessary because the power loads are already absorbing enough engine power to protect the drivetrain components. From block 412 control passes to block 420.

At block 414, since the electrical power consumption is less than the reduction in engine flywheel power to protect the drivetrain, some flywheel power reduction is required. The EIC determines the actual reduction in engine flywheel power (Actual RFP) needed as the reduction in engine flywheel power to protect the drivetrain (RFP) minus the power already being consumed by other power loads (EPC). At block 416, the EIC messages the ECU to command the engine to reduce flywheel power output by the calculated Actual RFP. Thus, the amount of engine flywheel power reduction is decreased by the monitored electrical power consumption. From block 416 control passes to block 420.

At block 420, the EIC checks if the vehicle gear is changed. If the vehicle gear is not changed control passes back to block 408 to continually monitor the power consumption by power loads other than the drivetrain and update the amount of engine flywheel power reduction to protect the drivetrain. If the engine gear is changed control passes back to block 402 to determine the new amount of engine flywheel power reduction that may be needed to protect the drivetrain and to go through the process with this new value.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A method for reducing engine flywheel power reduction of an engine on a vehicle while protecting a drivetrain of the vehicle, the method comprising:
   monitoring gear selection of a transmission of the vehicle;
   determining a reduction in engine flywheel power needed to protect the drivetrain as a result of the gear selection of the transmission;
   monitoring engine power consumption by power loads other than the drivetrain consuming power produced by the engine;
   when the engine power consumption by the power loads other than the drivetrain is less than the reduction in engine flywheel power needed to protect the drivetrain, reducing engine flywheel power by the difference between the reduction in engine flywheel power needed to protect the drivetrain and the engine power consumption by the power loads other than the drivetrain; and
   when the engine power consumption by the power loads other than the drivetrain is greater than or equal to the reduction in engine flywheel power needed to protect the drivetrain, not reducing the engine flywheel power.

2. The method of claim 1, wherein monitoring engine power consumption by power loads other than the drivetrain comprises monitoring power consumption by both on-vehicle and off-vehicle power loads that consume power generated by the engine.

3. The method of claim 1, wherein monitoring engine power consumption by power loads other than the drivetrain comprises monitoring power consumption by an electric generator, the electric generator consuming power produced by the engine.

4. The method of claim 3, wherein monitoring power consumption by the electric generator comprises:
   monitoring a speed and a torque of the electric generator; and
   computing power consumption of the electric generator as a function of the speed and the torque of the electric generator.

5. The method of claim 1, wherein monitoring engine power consumption by power loads other than the drivetrain comprises monitoring power consumption by a plurality of power inverters, each of the plurality of power inverters receiving power generated by the engine.

6. The method of claim 5, wherein the plurality of power inverters provide power to both on-vehicle and off-vehicle power loads.

7. The method of claim 1, further comprising:
   using a vehicle interface controller of the vehicle for monitoring the gear selection of the transmission;
   using an engine interface controller of the vehicle for determining the reduction in engine flywheel power needed to protect the drivetrain;
   using a power management unit of the vehicle for monitoring the engine power consumption by the power loads other than the drivetrain;
   communicating the gear selection of the transmission from the vehicle interface controller to the engine interface controller over a controller area network (CAN) bus of the vehicle;
   communicating the engine power consumption by the power loads other than the drivetrain from the power management unit to the engine interface controller over the CAN bus; and
   sending an engine power reduction command from the engine interface controller when the engine power consumption by the power loads other than the drivetrain is less than the reduction in engine flywheel power needed to protect the drivetrain.

8. The method of claim 7, wherein the power management unit monitors power consumption by both on-vehicle and off-vehicle power loads that consume power generated by the engine.

9. The method of claim 7, wherein the power management unit monitors power consumption by an electric generator, the electric generator consuming power produced by the engine.

10. The method of claim 7, wherein the power management unit monitors power consumption by a plurality of power inverters, each of the plurality of power inverters receiving power generated by the engine.

11. A system for reducing engine flywheel power reduction of an engine on a vehicle while protecting a drivetrain of the vehicle, the system comprising:
    a vehicle interface controller that monitors a transmission gear selection of the vehicle;
    a power management unit that monitors engine power consumption by power loads other than the drivetrain that consume power produced by the engine;
    an engine interface controller that determines a reduction in engine flywheel power needed to protect the drivetrain based on the transmission gear selection, and compares the reduction in engine flywheel power needed to protect the drivetrain with the engine power consumption by the power loads other than the drivetrain;
    wherein when the engine power consumption by the power loads other than the drivetrain is less than the reduction in engine flywheel power needed to protect the drivetrain, the engine interface controller generates a command to reduce engine flywheel power by the difference between the reduction in engine flywheel power needed to protect the drivetrain and the engine power consumption by the power loads other than the drivetrain; and when the engine power consumption by the power loads other than the drivetrain is greater than or equal to the reduction in engine flywheel power needed to protect the drivetrain, the engine interface controller does not generate a command to reduce the engine flywheel power.

12. The system of claim 11, wherein the power management unit monitors power consumption by both on-vehicle and off-vehicle power loads that consume power generated by the engine.

13. The system of claim 11, wherein the system further comprises an electric generator that consumes power produced by the engine, and the power management unit monitors power consumption by the electric generator.

14. The system of claim 13, wherein the power management unit monitors a speed and a torque of the electric generator, and computes the power consumption of the electric generator as a function of the speed and the torque of the electric generator.

15. The system of claim 11, wherein the system further comprises a plurality of power inverters that receive power generated by the engine, and the power management unit monitors power consumption by the plurality of power inverters.

16. The system of claim 15, wherein the plurality of power inverters provide power to both on-vehicle and off-vehicle power loads.

17. The system of claim 11, wherein the system further comprises:
   an electric generator that consumes power produced by the engine; and
   a plurality of power inverters that receive power generated by the electric generator;
   wherein the power management unit monitors power consumption by the plurality of power inverters.

18. The system of claim 11, further comprising a controller area network (CAN) bus, the vehicle interface controller, the power management unit and the engine interface controller communicating over the CAN bus.

19. The system of claim 11, further comprising an engine control unit that sends control commands to the engine, wherein when the engine power consumption by the power loads other than the drivetrain is less than the reduction in engine flywheel power needed to protect the drivetrain, the engine interface controller sends the command to reduce engine flywheel power to the engine control unit.

20. The system of claim 11, further comprising an operator input that a vehicle operator uses to select a transmission gear, and the vehicle interface controller monitors the operator input to determine the transmission gear selection.

* * * * *